(12) United States Patent
Petrescu et al.

(10) Patent No.: US 7,706,301 B2
(45) Date of Patent: Apr. 27, 2010

(54) ROUTING IN A DATA COMMUNICATION NETWORK

(75) Inventors: Alexandru Petrescu, Orsay (FR); Christophe Janneteau, Bois d'Arcy (FR); Hong-Yon Lach, Charenton-le-Pont (FR)

(73) Assignee: Motorola, Inc., Schaumburg, IL (US)

( * ) Notice: Subject to any disclaimer, the term of this patent is extended or adjusted under 35 U.S.C. 154(b) by 659 days.

(21) Appl. No.: 10/530,540

(22) PCT Filed: Oct. 8, 2003

(86) PCT No.: PCT/EP03/50704

§ 371 (c)(1),
(2), (4) Date: Apr. 6, 2005

(87) PCT Pub. No.: WO2004/034669

PCT Pub. Date: Apr. 22, 2004

(65) Prior Publication Data

US 2006/0050692 A1 Mar. 9, 2006

(30) Foreign Application Priority Data

Oct. 9, 2002 (EP) .................................. 02292485

(51) Int. Cl.
*H04L 12/26* (2006.01)
*H04L 12/56* (2006.01)
(52) U.S. Cl. .................... 370/254; 370/401; 455/436
(58) Field of Classification Search ................... None
See application file for complete search history.

(56) References Cited

U.S. PATENT DOCUMENTS 5,742,604 A * 4/1998 Edsall et al. ................. 370/401
6,385,174 B1 * 5/2002 Li ............................... 370/252
7,006,472 B1 * 2/2006 Immonen et al. ............. 370/332
7,054,328 B2 * 5/2006 Prasad et al. ................. 370/410
7,139,833 B2 * 11/2006 Heller ......................... 370/401
7,257,104 B2 * 8/2007 Shitama ...................... 370/338
7,398,301 B2 * 7/2008 Hennessey et al. .......... 370/412
2001/0043571 A1 * 11/2001 Jang et al. .................... 370/260
2002/0186693 A1 * 12/2002 Inoue et al. .................. 370/389
2003/0028623 A1 * 2/2003 Hennessey et al. .......... 709/219
2005/0213545 A1 * 9/2005 Choyi et al. ................. 370/338

FOREIGN PATENT DOCUMENTS

EP 1 011 241 A 6/2000

* cited by examiner

*Primary Examiner*—Gregory B Sefcheck
*Assistant Examiner*—Joshua Smith

(57) ABSTRACT

A method of supporting mobility in an Internet Protocol (IP)-based data network. The method comprises the steps of generating a first stateful IP autoconfiguration message at a mobile node, whereby the message includes an address capable of use for routing maintenance. The mobile node transmits the generated message to a first access node, which incorporates its address and forwards the message to a dynamic host configuration protocol (DHCP) Server. The DHCP Server and access node analyze the message to determine a route to deliver data to and/or from the mobile node. One or more route update message are triggered from said access node and said DHCP server to a number of network elements between said access node and said DHCP server in the IP based data network to support mobility in an IP domain with minimum bandwidth use and minimum tunneling required.

15 Claims, 5 Drawing Sheets

ROUTING IN A DATA COMMUNICATION NETWORK

FIELD OF THE INVENTION

This invention relates to data flow in communication and computer networks. The invention is applicable to, but not limited to, an addressing/routing mechanism for mobile nodes within such networks.

BACKGROUND OF THE INVENTION

The Internet is becoming more and more popular, with access to the Internet being provided via computer networks and communication networks. The standard communication mechanism that communication units use to access the Internet is the well-known Internet Protocol (IP) version 4 and version 6.

Indeed, users increasingly wish to access the Internet whilst on the move via their mobile communication device(s). These devices are termed mobile nodes in IP-parlance. Different types of mobile nodes may be employed for this purpose, for example, a portable personal computer (PC), a mobile telephone or a personal digital assistant (PDA) with wireless communication capability. Furthermore, mobile users are accessing the Internet via different types of fixed or wireless access networks, for example a cellular radio communication network, such as a Universal Mobile Telecommunication System (UMTS) network, a HiperLAN/2 or IEEE 802.11b local area network, a Bluetooth™ local communication system, or fixed accesses such as the Ethernet, and so on.

It is currently possible to support handover accessing of the Internet from one access network to another, for example by using a protocol known as Mobile-IP. Traditional mobility support aims to provide continuous Internet connectivity to mobile hosts, thereby allowing individual mobile users to connect to the Internet whilst being mobile by providing the mobile host with the opportunity to move the location of their Internet access. Recently, there has been a significant amount of interest and research in the Mobile IPv6 specification, as described in the document co-authored by David B. Johnson: IETF Internet-Draft draft-ietf-mobileip-ipv6-18.txt, June 2002.

Within IPv6 networks, host devices and client devices are allocated addresses comprising a hundred and twenty-eight bits to identify the device to other devices within, or external to, the network. The one hundred and twenty-eight bit addresses are known as Internet Protocol version 6 Addresses (IPv6 addresses). In the following, the terms IPv6 addresses and IP addresses are used inter-changeably. IP addresses provide a simple mechanism for identifying the source and destination of messages sent within IP networks.

Traditionally, IP addresses that identify devices within IP networks have been assigned in a static manner during network configuration. Using this type of static assignment, data routers and other network components are pre-configured to use the statically assigned address bindings that correlate devices to their IP addresses.

However, in large or rapidly changing networks, static assignment of IP addresses is often inadequate. As a result, several methods have been developed that allow IP addresses to be automatically assigned. The two widely used methods include:

(i) Automatic distribution by central servers, and
(ii) Address derivation by a close cooperation between hosts and the immediately neighbouring router.

In another method employed in some IP networks, routers analyse IP data packets received from client devices. Every data packet has a source address and a destination address. The source addresses in these data packets are extracted and used to update routes within the router to deliver data packets to and/or from particular devices. In those latter types of networks routes are updated based on the packets circulating within the network, but addresses are not automatically assigned.

A tunnelled packet is a data packet that encapsulates within it another data packet. Thus, the encapsulating data packet has a pair of source and destination addresses. A further encapsulated packet has additional source and destination addresses, and so on. Such a tunnelling mechanism allows a Home Agent to keep track of the current position of a Mobile Node and forward packets from the home position (designated by an IP address, or Home Address) to the new position (a new IP address, or the Care-of Address). From a routing perspective, tunnelling allows a route of the data packet to be determined, e.g. by de-tunnelling the data packets to determine the source address of each encapsulated packet.

Increasingly, IP addresses within networks are assigned by server systems using the Dynamic Host Configuration Protocol (DHCP) as is defined in Internet RFC 1541, which is incorporated herein by reference. For networks that use the DHCP protocol, one or more DHCP servers are configured to listen for messages requesting IP addresses. If possible, the DHCP server then allocates an IP address to the client system that sent the message. The newly allocated IP address is then included in a message sent by the DHCP server to the client system. The IP address is, in effect, provided to the client system on a time-limited basis, thereby allowing reuse of the same addresses by the same or a different client.

In general, the use of DHCP servers to assign IP addresses to client systems has proven to be particularly advantageous, saving non-expert users from manipulating long strings of digits (IP addresses). Furthermore, it allows an administrator tight control over the management of the address pool and guarantees the uniqueness of each used address. This is especially true in networks that include a large number of client systems.

Referring now to FIG. 1, a known IP routing mechanism is described that employs the IETF Mobile IPv6 protocol in a network. As an example, a network that is frequently found in a campus-type mobility network is shown. The network uses link technologies such as Ethernet and 802.11b.

In this regard, a mobile node 160 is operating in a micro-mobility (local-mobility) computer/communication domain. The micro-mobility computer/communication domain is configured as a tree structure, with a gateway 120 between nodes in the local domain and, say, the Internet 110. For example, let us assume the mobile node is a portable computer that is able to communicate with the Internet 110 by wirelessly coupling to any of a number of access points/access routers 140-150.

The access routers are typically coupled to Dynamic Host Configuration Protocol (DHCP) Relays. The routing functionalities (in software) and the DHCP Relay functionalities (in software) are executed within the same access node. Optionally, the two functionalities can be spread over two different nodes, but with the restrictions that:

(i) The Relay must be placed on the link immediately next to the mobile node in order to receive the broadcasted address autoconfiguration messages sent by the mobile node, and (ii) The Router functionality must be placed as far as possible towards the edge of the local mobility domain in order to ensure correct propagation of routes.

The micro-mobility domain includes routers 130, 132, 134 to link the access routers/DCHCP relays 140-150 to the gateway that includes a DHCP server 120. When the mobile node 160 has logged on to access router 140, it is assigned a temporary IP address, which is informed 165 to the MN's Home Agent 105. The MN 160 is able to access applications from application server 115, via a route 170 that encompasses the Internet 110, the gateway/DHCP server 120, and a number of serially-coupled intermediate routers 130 (with only one router shown) and the access router 140.

Notably, when the MN 160 logs on to another access router/DHCP relay 150, a new IP address is allocated to the MN. The new IP address is informed in message 175 to the MN's Home Agent 105 so that communication towards the home position (home address) of the MN can be routed to the new position of the MN 160 (Care-of Address). In this regard, a skilled artisan would appreciate that a network that employs an IETF Mobile IPv6 protocol is not ideally suited for managing a micro-mobility (or local mobility) domain. The unsuitability emanates from a high control overhead resulting from frequent notifications to the Home Agent 105.

Methods that use DHCP and Mobile IP to manage mobility at an IP level are described in the documents by Charles E. Perkins, et al.:
(i) "Using DHCP with Computers that Move", Proceedings of the Ninth Annual IEEE Workshop on Computer Communications, 1994; and
(ii) "DHCP for Mobile Networking with TCP/IP", Proceedings of the IEEE Symposium on Computers and Communications, 1995.

DHCP is used to dynamically obtain a Care-of-Address (CoA) that will subsequently be registered with a Home Agent. In this manner, a Home Agent builds and maintains IP tunnels that deliver packets to mobile nodes through the routers 130, 132, 134.

A significant problem with mobile nodes is the requirement to assign new CoAs as and when the mobile node accesses the network via a different access point. Furthermore, the tunnelling requirement in such IP systems, particularly in a micro-mobility domain, has been appreciated by the inventors of the present invention as a further significant disadvantage.

U.S.005812819A, titled "Remote Access Apparatus and Method which Allow Dynamic Internet Protocol (IP) Address Management", describes a mechanism to use the same CoA whilst changing points of attachment. The primary focus of U.S.005812819A is to use a unique personal identifier, such that with each re-connection, a user obtains the same CoA. However, although U.S.005812819A describes the maintenance of the same CoA, the mechanism still requires, and therefore suffers from the disadvantages of, inter-domain tunnelling by a Home Agent of Mobile IPv6.

'Address auto-configuration protocols' have been identified as an important requirement for IP mobile nodes in the following documents:
(i) Dynamic Host Configuration Protocol for IPv6 (DHCPv6), Internet Draft, draft-ietf-dhc-dhcpv6-19.txt; and
(ii) "DHCP for IPv6" by Charles E. Perkins, et al. Bound, and published at the Third IEEE Symposium on Computer and Communications, 1998.

The reasons identified for address auto-configuration protocols being an important requirement for IP mobile nodes include:

(a) Due to the wide Internet penetration having led to the Transport Control Protocol (TCP)/IP stack to be deployed in general-purpose computing machines, the user of such a machine rarely has the skill (or the desire) to manually configure its TCP/IP stack.
(b) With the advent of smaller and ubiquitous devices, it is often the case that there is no user to configure the device stacks: they must be configured as Plug-n-Play.

In IPv6 there exist two address autoconfiguration mechanisms: 'stateless' and 'stateful'. The important difference between these two mechanisms is that stateful autoconfiguration uses a pair of hosts (server and relay) to maintain an address database as well as to relay a node's request and relay replies in the allocation of an address across a network. In stateless autoconfiguration the message exchange for autoconfiguration is limited to one link and there is no state to maintain.

WO9826549, titled "Method for Using DHCP to Override Learned IP Addresses in a Network", describes a method whereby DHCP messages are scanned for IP assignment events. When an event is triggered, a pre-configured IP route is updated in a central 'router' table.

Each route provides a mapping between an IP address and a client system. When the router receives an IP packet, it extracts the destination address of the packet from the packet's header. The router then searches the route table for a route that matches the destination address of the received IP packet. If the router finds a matching route, the router forwards the IP packet to the client system included in the matching route.

Notably, the method is applicable in a dialup environment, where all clients connect to one router and all accessed servers are situated directly connected on the same router. Hence, the applicability of WO9826549 is very limited.

Using the DHCP protocol, client systems request and receive dynamically allocated IP addresses from the DHCP server systems. The router listens for DHCP ACK messages sent by DHCP server systems to the client systems. The DHCP ACK message includes an IP address that has been allocated to a specific client system. When the router detects a DHCP ACK message, the router extracts the IP address allocated for the client system. Using the IP address included in the DHCP ACK message, the router "learns" the IP address of the client system requesting an IP address. The router then adds the route to its route table. The new route is marked to indicate that the DHCP server has assigned it. Thereafter, the router will only relearn this IP address if it is reassigned by the DHCP server system.

In some cases, the learned IP address will conflict with a route originally configured within the router's route table. In these cases, the conflicting route is removed from the route table. In this way, WO9826549 allows routes that reflect dynamically allocated IP addresses to replace already configured routes. The inventors of the present invention have recognised and appreciated the limitations of this method in that it is only able to update routers with new IP routes and is inadequate to handle new IP routes in a network scenario.

Moreover, the method provides for updates within only one "central" router, where all clients and servers are connected and using it as a unique "central" node of communication. It is known that such star networks are not implementable for large systems with hundreds of clients and thousands of servers. The inventors of the present invention have recognised a need to provide for route updates within an entire cloud of routers, where everything is connected in a mesh-like topology, scaling the number of routes to connect any number of clients and servers.

U.S. Pat. No. 6,249,523, titled "Router for which a Logical Network Address which is not Unique to the Gateway Address in Default Routing Table Entries", presents a method to update ARP cache entries, effectively "routing" in a local broadcast link only, when triggered by DHCP messages.

It is noteworthy that the document titled "Cellular IPv6, Internet Draft Personal Proposal", draft-shelby-seamoby-cellular-ipv6-00.txt. describes a mechanism to manage IP mobility within a domain by appropriately updating per-host IP routes. Cellular IPv6 is a new protocol, which has been pending standardization for a number of years. Cellular IPv6 is equivalent to other routing protocols such as RIP. One of the reasons that Cellular IP has yet to be accepted for standardization is its use of paging concepts, which are natural in a 3GPP environment. However, such concepts are unfeasible with IP protocols, due to architectural inefficiencies such as network flooding (broadcast) of periodic (time-triggered) data over a large number of networks. Furthermore, the route status in this document is limited to a "personal proposal". As such, the mechanism is inadequate for standard IP mobility scenarios.

In summary, the inventors of the present invention have recognised that present implementations of IPv6 suffer from the need to regularly signal to remote home agents when a mobile node is mobile, for example, continuous updating of the mobile node's CoA. Furthermore, IPv6 introduces problems in tunnelling requirements, when some configurations may not necessarily need to incur such complex and bandwidth/throughput costly mechanisms. Current attempts at resolving one or more of the above problems have a consequent effect on other IP protocols.

STATEMENT OF INVENTION

In accordance with a first aspect of the present invention, there is provided a method of supporting mobility in an Internet Protocol (IP)-based data network, as claimed in claim 1.

In accordance with a second aspect of the present invention, there is provided an access node such as a DHCP Relay, as claimed in claim 7.

In accordance with a third aspect of the present invention, there is provided a DHCP Server, as claimed in claim 8.

In accordance with a fourth aspect of the present invention, there is provided a data communication network, as claimed in claim 14.

In accordance with a fifth aspect of the present invention, there is provided an IPv6 communication message, as claimed in claim 18.

In accordance with a sixth aspect of the present invention, there is provided a storage medium, as claimed in claim 19.

In accordance with a seventh aspect of the present invention, there is provided an apparatus, as claimed in claim 20.

In accordance with an eighth aspect of the present invention, there is provided a communication unit, as claimed in claim 21.

In accordance with a ninth aspect of the present invention, there is provided a data communication network, as claimed in claim 22.

Further aspects of the present invention are as claimed in the dependent Claims.

In summary, the preferred embodiment of the present invention describes a mechanism to manage IPv6 local mobility without requiring any tunnelling of data messages towards a remote Home Agent. The mechanism utilises address autoconfiguration mechanisms capable of use in route maintenance. Advantageously, route update messages may be sent from both a DHCP Server and an access node such as a DHCP Relay when new IP routes are determined. Preferably, old or unacceptable IP routes are deleted within the local mobility. The method is able to use standard IETF protocols, such as DHCPv6 and RIP.

Figure 1:
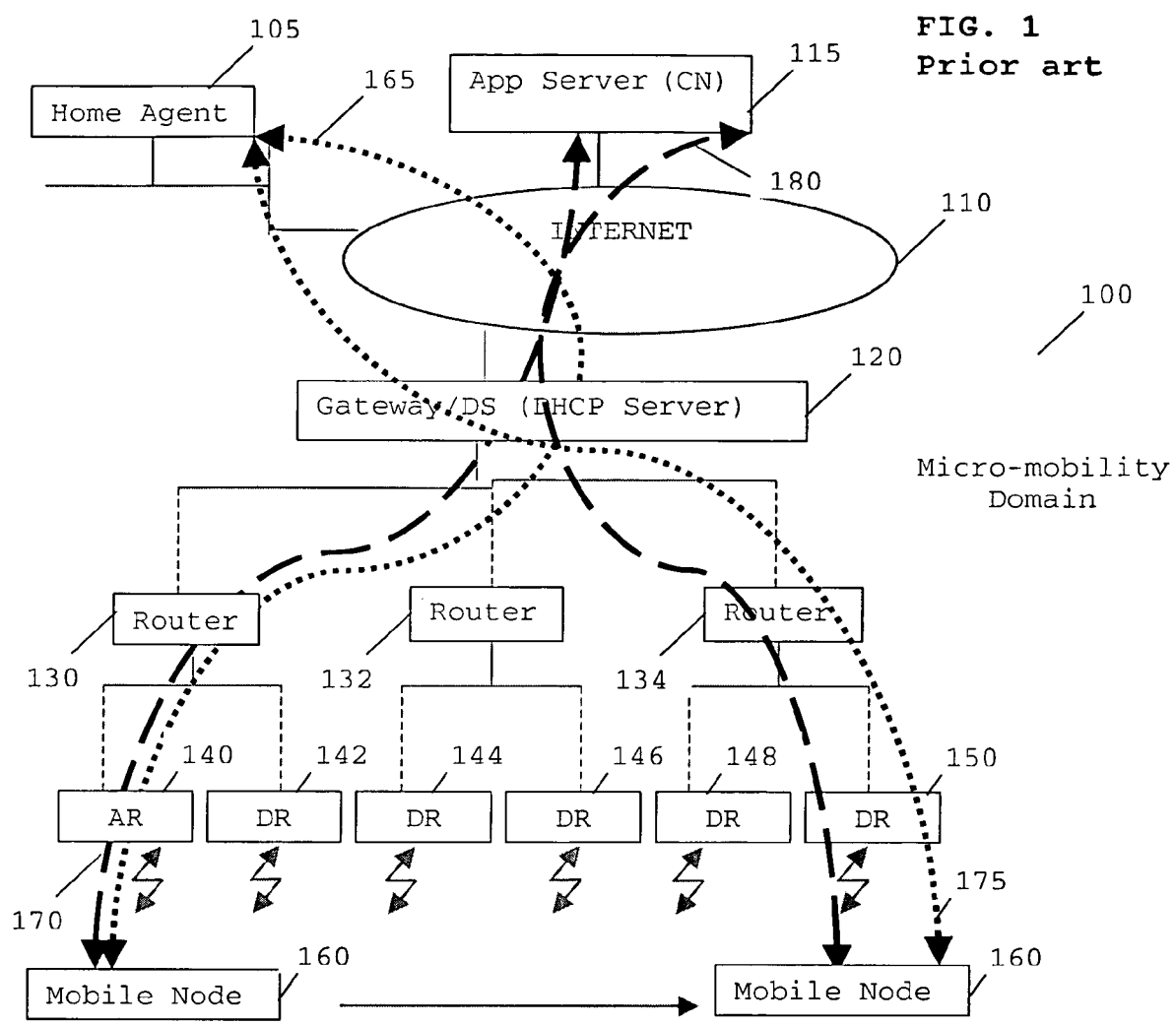
FIG. 1 illustrates a known computer/communication mobile network and mechanism for communicating to a mobile node.
Figure 2:
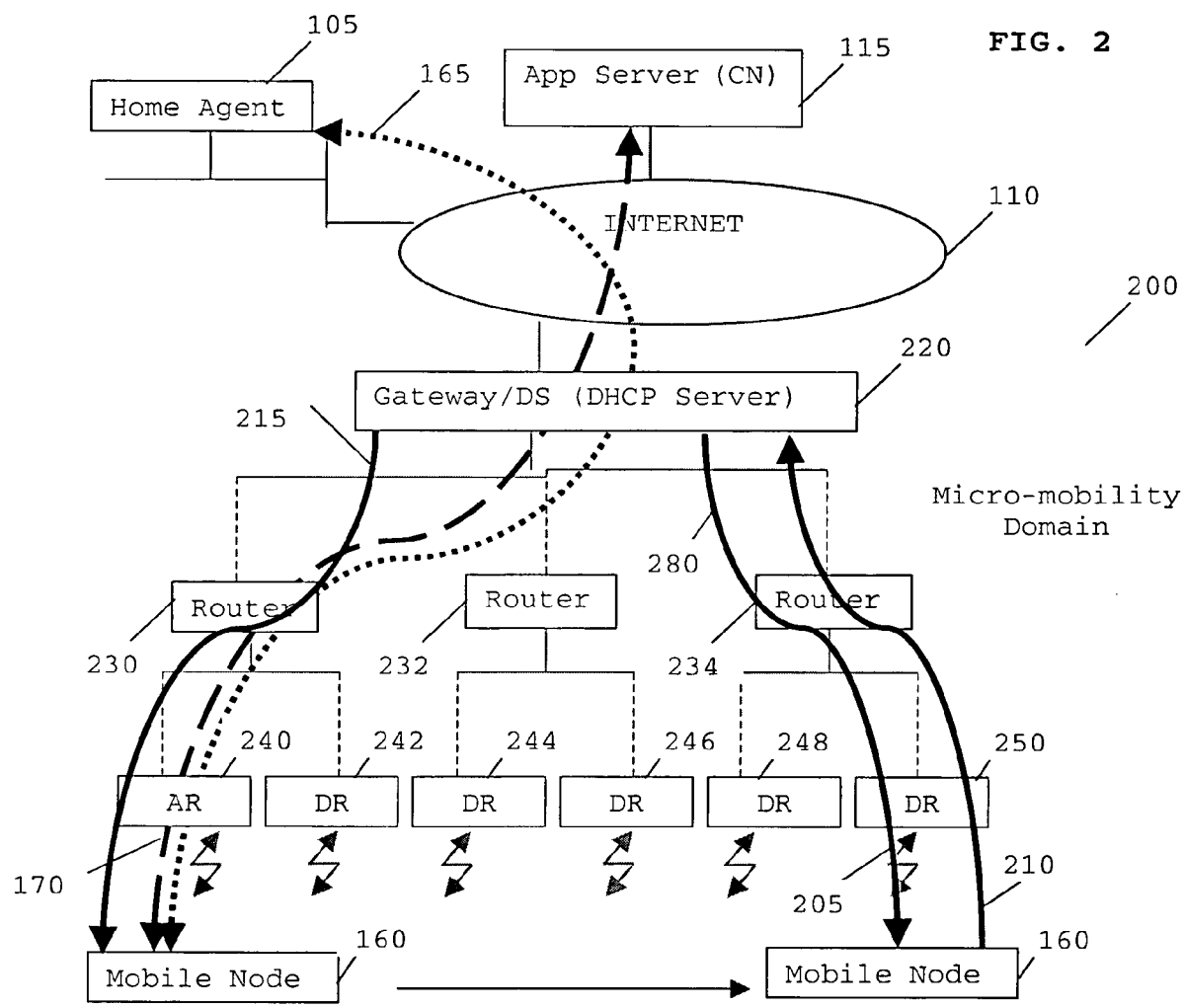
Figure 3:
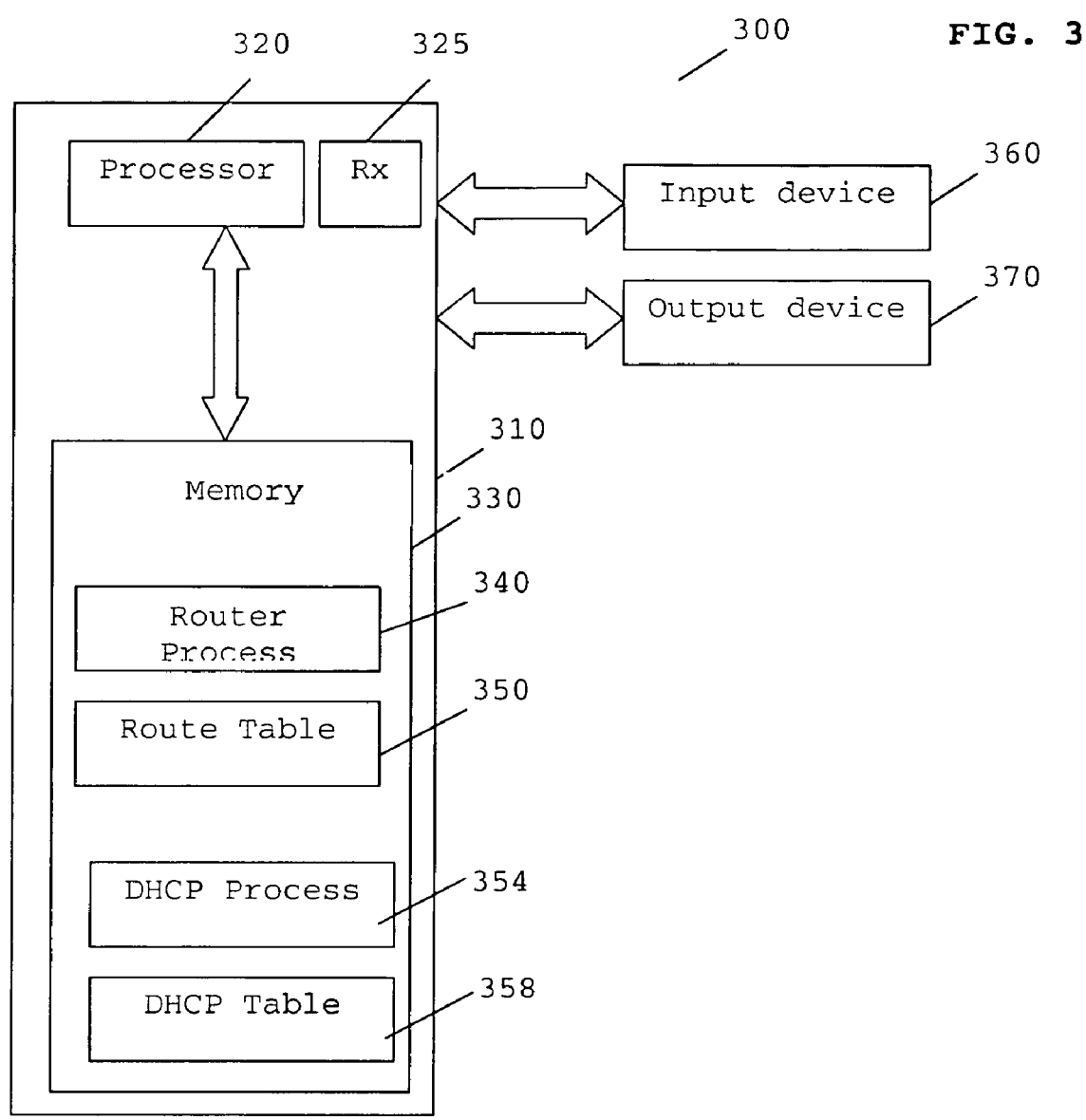
Figure 4:
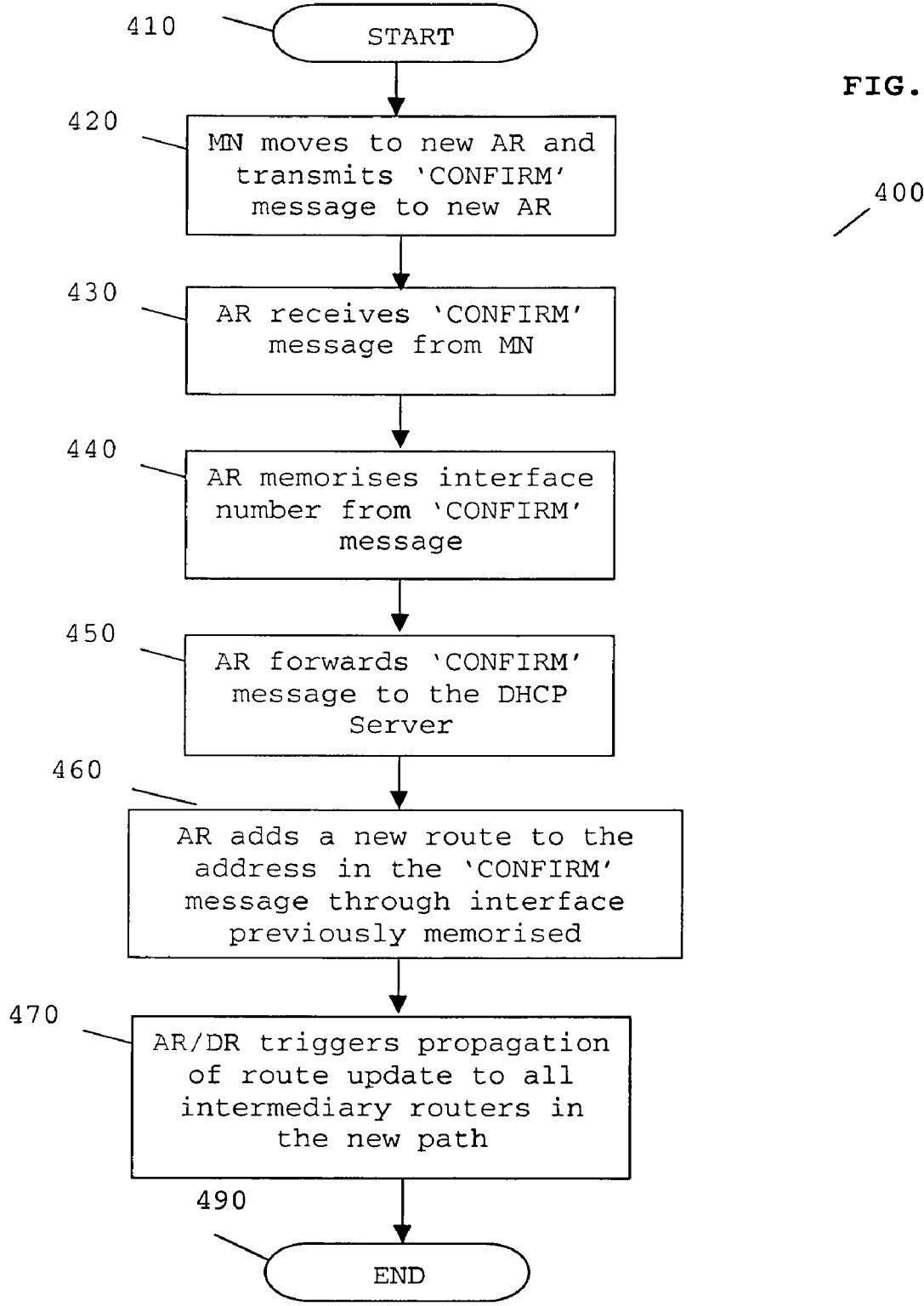
Figure 5:
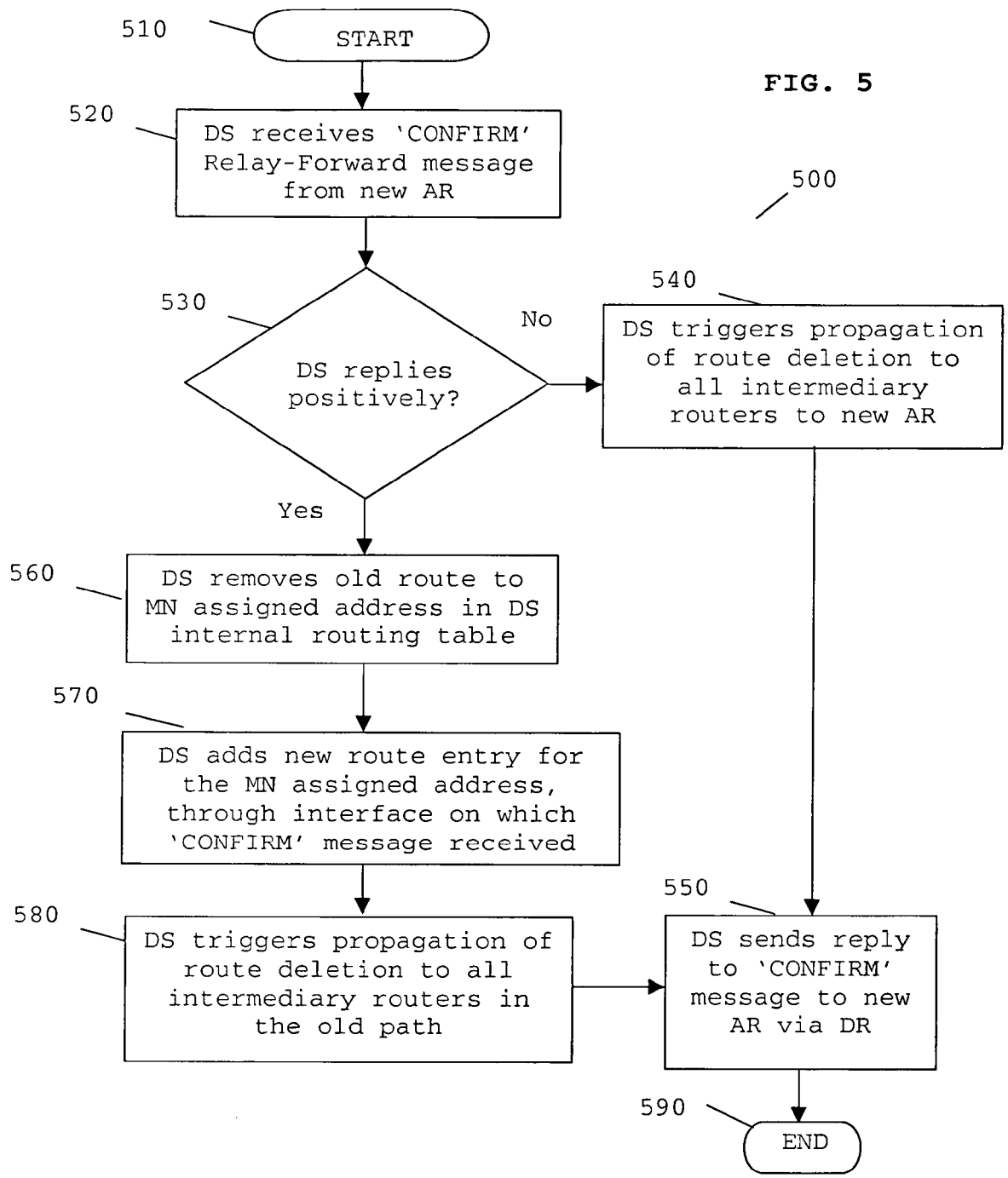

Exemplary embodiments of the present invention will now be described, with reference to the accompanying drawings, in which:

FIG. 2 illustrates a computer/communication mobile network adapted to implement the preferred embodiment of the present invention;

FIG. 3 illustrates a Dynamic Host Configuration Protocol (DHCP) Server adapted to implement the preferred embodiment of the present invention;

FIG. 4 illustrates a flowchart of a process implemented by an access router DHCP Relay according to the preferred embodiment of the present invention; and FIG. 5 illustrates a flowchart of a process implemented by a DHCP server, according to the preferred embodiment of the present invention.

DESCRIPTION OF PREFERRED EMBODIMENTS

Referring now to FIG. 2, a network configuration is illustrated in accordance with the preferred embodiment of the present invention. The network configuration preferably employs the IETF Mobile IPv6 protocol. As an example, a network that is frequently found in a campus-type mobility network is shown. The network uses link technologies such as Ethernet and 802.11b.

The preferred network topology, as illustrated in FIG. 2, is a tree-type structure as known to those skilled in the art. However, although the preferred embodiment is described with reference to a tree-type structure, the inventive concepts described herein are equally applicable to any mesh-type structure. Conceptually, the root of the tree corresponds to the DHCP server (DS), with the MN movement managed only by the leaves of the tree. The preferred embodiment shows the last hops as using wireless access media, to communicate to the mobile nodes, although any access mechanism is acceptable (including dialup and other wired accesses like DSL, or plain Ethernet).

It is also assumed, in the context of the preferred embodiment of the present invention, that each access router (AR) is co-located with a DHCP relay (DR), and the Internet Gateway with the DHCPv6 Server respectively. All intermediate routers are normal routers.

In this regard, a mobile node 160 is operating in a micro-mobility (local) computer/communication domain. The micro-mobility (local) computer/communication domain is configured as a tree structure, with a gateway 220 between nodes in the local domain and, say, the Internet 110. For example, let us assume the mobile node is a portable computer that is able to communicate with the Internet 110 by wirelessly coupling to any of a number of access points/access routers 240-250.

The micro-mobility domain includes routers 230, 232, 234 linking the access routers/DCHCP relays 240-250 to the gateway that includes a DHCP server 220. When the mobile node 160 has logged on to access router 240, it is assigned a temporary IP address, which is informed 165 to the MN's Home Agent 105. The MN 160 is able to access applications from application server 115, via a route 170 that encompassed the Internet 210, the gateway/DHCP server 220, and a number of arbitrarily, or mesh-coupled intermediate routers 230 (with any number of intermediate routers on each path shown) and the access router 240.

Notably, in accordance with the preferred embodiment of the present invention, when the MN 160 logs on to another access router/DHCP relay 250, the same IP address is used. In this regard, when a MN changes its point of attachment between two Access Routers (AR), say AR 240 and AR 250, it confirms its previously acquired address to the DHCPv6 Server (DS) 220 via the DHCPv6 Relay (DR) co-located with the current AR 250. A 'CONFIRM' message then triggers an updating of routes in the DS 220, from the path towards the previous AR 240, to the path towards the new AR 250 with the route including all of the corresponding intermediate routers 234. A new route is therefore added to the address within the message by the access router/DHCP relay 250. The 'CONFIRM' message is concurrently relayed to the DS 220.

Instead of passing on a potentially new CoA for the new route to the Home Agent 105 of the MN 160, the DS 220 effectively receives the 'CONFIRM' message from the DR containing the same CoA (the "confirmed" address) and updates its routing table. In this manner, any new messages for MN 160, coming from the Internet 110 and sent via the gateway/DHCP server 220 are intercepted and re-routed to the new address, thereby not following the old route.

Thus, it is envisaged that any access node, for example a dynamic host configuration protocol (DHCP) Relay 250 includes a receiving function receiving at least one Internet Protocol (IP) message from a mobile node, wherein the IP message includes a mobile node address capable of use for route maintenance to deliver data to and/or from the mobile node. The access node also includes a processor, operably coupled to the receiving function, to intercept and analyse the IP message, and determine a route to deliver data to and/or from the mobile node. The access node 250 triggers a transmission of one or more route update messages from via a number of network elements (such as intermediate routers 230 between said access node to a DHCP server in the IP based data network.

Preferably, the old route is deleted; once the gateway/DHCP server 220 has accepted the new route to the MN 160, in order to correctly forward packets coming from inside the local-mobility domain.

The networking protocols are based on IPv6 and as such employ IPv6 stateful address autoconfiguration (i.e. DHCPv6) and a distance-vector routing protocol. A preferred distance-vector routing protocol, such as Triggered Routing Information Protocol (RIP), is used. In this regard, the DHCP CONFIRM message is used to trigger the Triggered RIP.

Autoconfiguration:

A stateful autoconfiguration mechanism is selected as the presence of a DR and DS 220 at the extremities of the micro-mobility routing domain allows tight control of routing path updates. In the stateless case, the routing path update(s) can only be triggered by one end of the routing path, i.e. the AR 250.

A particular message exchange deals with the renewal (or release thereof) of an already allocated IPv6 address of an MN when this moves to a new link. The message exchange tracks the following process: upon detection of movement and after attaching to a new AR 250, the MN 160 generates a CONFIRM message containing various identifiers of its configured interfaces, among which it uses the address it had used when first configuring this interface with a server. The CONFIRM message is sent to the DR (supposedly co-located with the new AR) and next propagated to the DS 220. Following reception of the 'CONFIRM' message, the DS 220 generates a 'REPLY' message to send to the MN 160 through the corresponding DR. In this way, the DHCPv6 transaction is completed and the MN 160 can continue to use the originally allocated address within the new subnet under the new AR 250.

Triggering Mechanism:

The preferred triggering mechanism is a set of processor-implementable instructions (i.e. software) that couples the interpretation of DHCP messages (CONFIRM by DS and DR and ACK for DR) with RIP messages (Unsolicited Route Updates). The reception and interpretation of standard DHCP messages is enhanced to launch standard RIP messages. Routing Information Protocol (RIP) is a standard distance-vector algorithm for exchanging routing messages and computing routes within an Administrative Domain.

The preferred embodiment of the present invention is independent of the underlying per-host routing protocol, and employs a slight modification of RIP such that the protocol:

(i) Includes standard RIP v2 features;
(ii) Includes standard Triggered RIP extensions;
(iii) Includes standard RIPing extensions, since this is an IPv6 environment;
(iv) Provides periodic updates by transmitting entire routing tables are entirely removed; and
(v) Propagates updates of per-host routes upon reception of Triggered update.

Traditionally, IP routing protocols are designed with no specific topology assumptions. In such circumstances, the underlying model assumes that the connectivity among routers takes the form of, say, a graph and links periodically fail and come up. A routing protocol is designed such that the network as a whole survives this kind of interruption.

In this manner, the network provides IP mobility within a local mobility domain by setting up and maintaining IP routes. When a MN changes its point of attachment between two Access Routers (AR) it confirms its previously acquired address to the DHCPv6 Server (DS) via the DHCPv6 Relay (DR) co-located with the current AR. The CONFIRM message triggers the launch of Triggered Route Updates, thus changing the routes in the DS, the previous AR, the new AR and in all intermediate routers.

A skilled artisan would recognise that the number of elements shown in the network of FIG. 2 are limited for clarity purposes only. Furthermore, it is within the contemplation of the invention that other network configurations and-inter-coupling of elements can be used.

Advantageously, the inventors of the present invention have recognised and appreciated the wider benefits offered by dynamically building and maintaining per-host routes within a small micro-mobility domain. In particular, the inventors have identified that per-host routing, which has traditionally been implemented for large-sized networks such as the Internet that spans continents and supports large-size of routing tables and very frequent updates of a large number of mobiles), is more appropriate than using tunnels due to the:

(i) Simplicity of routing protocols and wide availability of implementations;
(ii) More efficient use of bandwidth, otherwise used to encapsulate packets in a tunnelling mechanism;
(iii) Avoidance of a need to introduce entirely new protocol entities (local mobility agents); and (iv) Relatively minor adaptation of existing routers and DHCPv6 servers, as described below.

Hierarchical Mobile IPv6 schemes, as described by: Claude Castellucia, in "A Hierarchical Mobile IPv6 Proposal", of the 4$^{th}$ ACTS Mobile Communications Summit, 1999 and David B. Johnson and Charles E. Perkins in Hierarchical Foreign Agents and Regional Registration, Minutes of the Mobile IP working group meeting, 35$^{th}$ IETF, March 1996. The inventive concepts of the present invention provide two important benefits over known Hierarchical Mobile IPv6 schemes:

(i) Bandwidth savings by eliminating tunnels.
(ii) Elimination of local mobility management entities (e.g. MAP) that have been pending IETF standardization for several years.
(iii) Use of the same CoA within the entire local-mobility domain (HMIP changes the CoA, but does not propagate the change up to the distant home agent (HA). Advantageously, the inventive concepts described herein not only avoid propagating the CoA to HA, but maintain the same CoA).

When compared to all other micro-mobility (or local mobility) management schemes, the inventive concepts herein described provide:

(i) The inherent configuration flexibility of stateful auto-configuration, whereas the other micro-mobility management schemes all suppose the IP address is manually configured;
(ii) Ability to implement a more rapid propagation of route updates by simultaneously triggering route updates from two separate points of the tree, namely the DS and the DR, whereas other micro-mobility management schemes trigger the route update from one point only; and
(iii) The process of the present invention is able to use standard IETF protocols.

Referring now to FIG. 3, a Dynamic Host Configuration Protocol (DHCP) Server 310 adapted in accordance with the preferred embodiment of the present invention, is illustrated. The DHCP Server 310 includes a signal processing function 320 operably coupled to a receiving function 325 and a memory element 330. The memory element comprises a router processing function 340 and a route table 350. The DHCP Server 310 communicates to other devices in the network via an input port 360 and an output port 370. The DHCP Process uses a DHCP Address Table to keep track of assignments of addresses to mobiles, as well as approving and denying requests.

In accordance with the preferred embodiment of the present invention, the receiving function receives at least one first Internet Protocol message from a mobile node through a first access node, as described above. The at least one first Internet Protocol message comprises an address that is used to build a data route to deliver data to and/or from the mobile node via the first access node. The signal processing function 320 processes the first Internet Protocol message to determine the data route to/from the mobile node, and stores the route information.

The DHCP Server 310 has been adapted to receive at least one second Internet Protocol message from the mobile node through a second access node, such that the second Internet Protocol message comprises an address used to build a second data route. The signal processing function 320 then determines whether the second data route is the same as the stored first data route. In response to the determination, the DHCP Server 310 triggers a message to all its neighbour routers and subsequently to all routers in the routing domain deleting the first data route if the second route is accepted. Alternatively, the DHCP Server 310 triggers a message to the second access node deleting the second data route, if the new route is not accepted.

Preferably, the first and second Internet Protocol messages are IPv6 messages such as IPv6 stateful autoconfiguration 'CONFIRM' messages. In an enhanced embodiment of the present invention, the signal processing function 320 intercepts DHCPv6 stateful autoconfiguration IP messages sent from mobile nodes via ARs and processes the message to determine a new data route to deliver data to and/or from the mobile node. In response, the new route is used to update the data route in the router table in response to the processed DHCPv6 stateful autoconfiguration IP message. The signal processing function 320 then sends a delete route message to network elements in the data route to update their route records.

Referring now to FIG. 4, a flowchart 400 illustrates a preferred operation of the Access Router. It is assumed that the MN has already configured an address for its interface with a normal DHCPv6 transaction, as described above with respect to FIG. 2. Furthermore, it is assumed that the MN is currently active within a sub-network, whilst its routing address indicates access to/from the MN via the old AR. The mobile node has previously confirmed this old address to the DS through the DR.

The operation of the new AR starts in step 410. The MN moves to a new AR. The MN generates a 'CONFIRM' message and transmits this message to the new AR as shown in step 420. Upon reception of the CONFIRM message in step 430, the AR memorises the interface address from which it received the 'CONFIRM' message, in step 440.

The DR (operably coupled to the AR) routes the 'CONFIRM' message up to the DS, as shown in step 450. In addition, the DR also adds a new route to this address through the (memorised) interface address that received the 'CONFIRM' message, as in step 460. This route addition to the 'CONFIRM' message is propagated up-stream to all intermediary routers in the new path to the DS, preferably by means of Unsolicited Route Update messages, as shown in step 470. In this manner, the MN has moved to a new access point and a new route to the MN has been generated by the AR/DR in the 'CONFIRM' message sent to the DS.

Referring now to FIG. 5, a flowchart 500 illustrates a preferred operation of the DHCPv6 Server (DS), in response to receiving a 'CONFIRM' message with a new route update from the AR/DR as described above with respect to FIG. 4.

The DS operation starts in step 510. Upon reception of the 'CONFIRM' Relay-Forward message from the new AR in step 520, the DS decides to either reply positively (preferably triggering deletion of the old route) or negatively (preferably triggering deletion of the new route previously added by DR), in step 530.

It is envisaged that the DS replies negatively when it decides that the MN took too much time to switch between ARs. For example, the laptop MN may have entered a sleep mode, or even turned off, in which case the DS denies the CONFIRM because the address was allocated to another new MN in the meantime. Alternatively, when the MN connects to another local-mobility domain, it will CONFIRM this address towards another DHCP Server that doesn't own that address.

If the DS decides to reply negatively to the 'CONFIRM' message in step 530, the DS triggers propagation of a route deletion message to all intermediary routers to the new AR, in step 540. In this manner, all intermediary routers that have just recorded a new route to the MN address, as extracted from the 'CONFIRM' message sent from the AR to the DS, will delete the new route record. In this regard, the DS sends a reply to the 'CONFIRM' message to the MN, via the corresponding AR/DR, to inform the MN, and implicitly the intercepting AR/DR of the negative decision, as shown in step 550.

If the DS decides to reply positively to the 'CONFIRM' message in step 530, the DS removes the old route to the MN assigned address, as stored in its internal routing table as shown in step 560. Substantially concurrently, the DS adds the new route entry to the MN assigned address, where the route indicates the interface through which the 'CONFIRM' message was received, as in step 570. The DS then triggers propagation of a route deletion message to all intermediary routers between itself and the old AR/DR, in step 580. In this manner, all intermediary routers that have recorded a now obsolete route to the MN address will delete the route record. In this regard, the DS sends a reply to the 'CONFIRM' message to the MN, via the corresponding DR. The reply informs the MN, and implicitly the intercepting DR/AR of the negative decision, as shown in step 550.

In this manner, the DHCPv6 Server is able to allocate the same (CoA) address to the MN, upon the MN moving to a new access router. Advantageously, in this approach, the MN's care-of-address is then maintained as a valid address for the entire micro-mobility domain, irrespective of which access router the MN uses within the domain.

Furthermore, by intercepting the message to the home network, the combination of the new AR/DR and DHCPv6 Server is able to maintain an IP address to the MN, without taking up valuable bandwidth resource in propagating the new route within the micro-mobility domain to higher entities in the network.

A further advantage of this mechanism is that, by provision of a single MN CoA throughout the local mobility (micro-mobility) domain, there is no requirement to perform tunnelling and de-tunnelling operations, which also take up valuable resource (i.e. computing resource on nodes and bandwidth resource on networks).

The inventive concepts of the present invention find particular applicability in mobility-supporting network domains such as a university campus or in a company where nodes are, for example, spread over multiple-storeys in a building. The topology of such networks is typically a tree-structure with rarely more than three levels in the structure. The mobility population of such domains typically encompass a few hundred nodes. The majority of the communication in these domains takes place among nodes within the domain, and not to an external Internet. Furthermore, local nodes are able to move within the domain. Also, visiting nodes can be accepted to visit and move within this domain quite readily.

Such a domain preferably deploys an Interior Gateway Protocol (IGP) routing protocol, for example a Routing Information Protocol (RIP), as well as a stateful address autoconfiguration scheme such as (DHCP). Thus, within this domain, it is more economically viable to reuse DHCP and RIP functionalities rather than deploying Mobile IP entities, which would require modifying every client PC, every server and introducing home agents.

The inventors of the present invention have recognised that in such a domain, the DHCP server (DS) is never in a situation to refuse a CONFIRM message. Hence, a moving PC will always use the same care-of-address within this domain. This address is its only address and there is therefore never a need to assign a Home Address and a Care-of-Address as is required by Mobile IPv6.

In this case, a modified operation of the AR/DR in FIG. 4, as well as the DS in FIG. 5, can be implemented. In particular, it is envisaged that both the DS and AR may trigger the route addition to all intermediate routers. Advantageously, such a two-pronged route update triggering mechanism effectively leads to faster updates.

Thus, a mechanism to combine address autoconfiguration with route maintenance, in order to support mobility, has been described. This is in contrast to traditional address autoconfiguration mechanisms, which have been performed entirely automatically and separately from route maintenance. Route maintenance has been performed in a half-manual/half automatic manner, inasmuch as routing information is initially introduced manually in each router and then routers communicate with each other to discover the shortest available routes.

It is to be appreciated that the arrangement and specific details of interfaces, address types, routers, etc. in the above embodiments are merely examples, and the invention is not limited to these examples. The invention should be viewed as capable of being applied to other types of data (computer/communication) networks or protocols and subnets thereof. Furthermore, the invention may also be applied to domains other than a tree-structure or a substantially micro-mobility domain, when such networks have subnets and access networks whose functions correspond to those described above.

The invention, or at least embodiments thereof, tend to provide the following advantages, singly or in combination:
(i) A data packet may be transmitted much more efficiently, with a minimum of number of tunnelling operations performed by intermediary routers, thereby achieving improved route updating.
(ii) When compared to hierarchical Mobile IPv6 schemes, the inventive concepts described above provide:
 (a) Bandwidth savings, by eliminating tunnels; and
 (b) Elimination of local mobility management entities (e.g. Mobility Anchor Point (MAP)) which have been pending IETF standardization for several years.
 (c) Use of the same CoA, avoids updating not only the distant HA but also any new entity, such as a MAP.
(iii) When compared to all other micro-mobility (or local mobility) management schemes, the inventive concepts described above provide:
 (a) Inherent configuration flexibility of stateful autoconfiguration, in contrast to other micro-mobility management schemes where the IP address is manually configured;
 (b) A more rapid propagation of route updates, by simultaneously triggering from two separate points of the tree, namely the DS and the DR; and
 (c) Compatibility benefits as standard IETF protocols can be used.
(iv) When compared to Cellular IPv6, the present invention does not use any form of paging. Thus, no broadcasting of data is required and a more efficient and less bandwidth hungry solution is achieved. In contrast to Cellular IP, the present invention proposes a "per-host routes" proposal, that notably relies on standard RIP and DHCP as existing, fully specified, software available solutions.
(v) The technique benefits from using the same CoA for the routing of all data packets to a particular mobile node, say within a micro-mobility domain, but with the elimination of intra-domain tunnelling suffered by the mechanism proposed in U.S.005812819A.

Whilst the specific and preferred implementations of the embodiments of the present invention are described above, it is clear that one skilled in the art could readily apply variations and modifications to the preferred embodiments that fall within the inventive concepts.

Thus, a methods to support local mobility in TCP/IP networks and associated network elements have been described, whereby the disadvantages associated with known mechanisms, apparatus and methods have been substantially alleviated.

The invention claimed is:

1. A method of supporting mobility in an Internet Protocol version 6 (IPv6)-based data network, the method characterised by the steps of:
    generating a first stateful IPv6 autoconfiguration message at a mobile node, wherein said message contains an IP address capable of use for route maintenance to and from said mobile node;
    transmitting, by said mobile node, said generated message to a first access node, where said access node adds an IP address of said access node to said message;
    forwarding said generated message, by said first access node, to a dynamic host configuration protocol (DHCP) Server;
    analysing said message, at said DHCP server, to determine a route to deliver data one or more of to said mobile node and from said mobile node;
    analysing said message, at said access node, to determine a route to deliver data one or more of to said mobile node and from said mobile node;
    triggering one or more route update messages from said access node and said DHCP server to a number of network elements between said access node and said DHCP server in the IP based data network, wherein said one or more route update messages from said access node and said DHCP server are triggered substantially simultaneously;
    repeating said steps of generating, transmitting and forwarding for a second stateful IP autoconfiguration message that confirms the IP address of said mobile node when said mobile node attaches to a second access node, where said second access node substitutes its address in said second message; and
    in response to receiving said second stateful IP autoconfiguration message, generating one or more route update messages by said second access node and said DHCP server.

2. The method of supporting mobility according to claim 1, herein generating one or more route update messages in response to receiving said second stateful IP autoconfiguration message comprises the steps of:
    analysing said second stateful IPv6 autoconfiguration message at said DHCP Server to determine that said address used for route maintenance in said second message is inconsistent with said address analysed in said first message; and
    triggering a route update message based on said determination.

3. The method of supporting mobility according to claim 2, the method further characterised by the step of:
    transmitting, in response to said determination, a deletion message to said first access node or said second access node and a number of network elements between said DHCP Server and said first access node or said second access node, where the deletion message instructs said number of network elements to delete obsolete address information used for route maintenance to/from said mobile node.

4. The method of supporting mobility according to claim 1, wherein one or more of said first and second stateful Internet Protocol autoconfiguration messages is a DHCPv6 'CONFIRM' message.

5. The method of supporting mobility according to claim 1, wherein said address information used for route maintenance is based on Triggered routing information protocol (RIP).

6. The method of supporting mobility according to claim 1, further characterised by the step of:
    updating route maintenance information by a plurality of nodes in the IP-based data network, wherein the plurality of nodes comprises one or more of a DHCP Server, a DHCP Relay, an Access router, and an intermediate router.

7. An Internet Protocol version 6(Ipv6)-based network that is operable to generate a first stateful IP autoconfiguration message at a mobile node, wherein said message contains an address capable of use for route maintenance to and from said mobile node, the network comprising hosts including one or more of a first access node, a dynamic host configuration protocol (DHCP) Relay, and a DHCP Server, the networking comprising:
    a means for receiving the first stateful Ipv6 autoconfiguration message from said mobile node, wherein said message comprises a mobile node IP address capable of use for route maintenance to deliver data to, and receive data from, said mobile node, wherein said means for receiving further receives, from a second access node, a second stateful Ipv6 autoconfiguration message that confirms the IP address acquired by said mobile node prior to accessing said second access node, wherein said second access node adds its address to said second message and wherein said DHCP Server receives and analyses the second stateful IPv6 autoconfiguration message to determine whether said IP address therein is consistent with a set of addresses maintained by the DHCP Server in association with the mobile node;
    a means for analyzing said first stateful IPv6 autoconfiguration message to determine a route to one or more of deliver data to, and receive data from, said mobile node; and
    a means for triggering transmission of one more route update message from said first access node and said DHCP Server to a number of network elements between said first access node and a said DHCP Server in the IPv6-based data network, wherein said one or more route update messages from said first access node and said DHCP server are triggered substantially and simultaneously and wherein said means for triggering, in response to said determination of whether said IP address in the second stateful IPv6 autoconfiguration message is consistent with a set of addresses maintained by the DHCP Server in association with the mobile node, triggers one or more route update messages to one or more of said first access node and said second access node to delete obsolete address information used for route maintenance to and from said mobile node.

8. The network according to claim 7, wherein one or more of said stateful IPv6 autoconfiguration messages is an IPv6 stateful autoconfiguration 'CONFIRM' message.

9. The network according to claim 7, further characterised by a memory element, operably coupled to said means for analyzing, containing a router table for storing route maintenance information extracted from said IP message.

10. The network according to claim 7, wherein one or more of said first access node and said second access node are Access Routers collocated with DHCPv6 Relay functions.

11. The network according to claim 7, wherein the network includes a number of routers located one or more of between said first access node and said DHCP Server and between said second access node and said DHCP Server in a substantially tree-type topology.

12. The network according to claim 7, wherein a communication link one or more of between said mobile node and said first access node and between said mobile node and said second access node is a wireless access media communication link to facilitate a wireless link.

13. An IPv6 communication message transmitted from a DHCP Server to an access node via a number of routers, wherein the IPv6 communication message comprises one or more of route deletion instructions and address deletion instructions generated in accordance with claim 3.

14. A non-transitory storage medium storing processor-implementable instructions to carry out the method according to claim 1.

15. An apparatus adapted to perform the method steps according to claim 1.

* * * * *